United States Patent [19]

Basile

[11] 4,185,752
[45] Jan. 29, 1980

[54] PRESSURE COOKER LID FASTENING MEANS

[76] Inventor: Pedro Basile, Rua Basile, 132, Sao Paulo, Brazil

[21] Appl. No.: 879,160

[22] Filed: Feb. 21, 1978

[30] Foreign Application Priority Data

Aug. 8, 1977 [BR] Brazil .................................. 7705242

[51] Int. Cl.² .............................................. B65D 45/23
[52] U.S. Cl. .................................. 220/314; 220/325; 220/243; 220/249
[58] Field of Search ............................... 220/243–245, 220/249–251, 314, 315, 316, 318, 325, 367, 203

[56] References Cited

U.S. PATENT DOCUMENTS

| 2,457,927 | 1/1949 | Scudder | 220/325 |
| 2,544,854 | 3/1951 | Oys et al. | 220/249 |
| 3,632,014 | 1/1972 | Basile | 220/325 X |

FOREIGN PATENT DOCUMENTS 447846 12/1949 Italy ........................................ 220/243

Primary Examiner—George T. Hall
Attorney, Agent, or Firm—Cesari and McKenna

[57] ABSTRACT

A pressure cooker including a receptacle open at the top, a lid for closing the receptable, locking means engaging the lid and a plurality of brackets attached to the receptacle for engagement with the locking means characterized in that the plurality of brackets overhang the rim of the receptacle and are positioned around the receptacle so that the lid cannot be removed from the receptacle laterally but not vertically.

1 Claim, 4 Drawing Figures

PRESSURE COOKER LID FASTENING MEANS

BACKGROUND OF THE INVENTION

This invention relates to an improved pressure cooker of the type having a receptacle open at the top, a lid for closing the receptacle, locking means engaging the lid and a plurality of brackets fixed to the receptacle and engageable with the locking means to retain the lid on the receptacle when the latter is pressurized.

In the prior art, the brackets used to engage the locking means are outboard of the lid or located beneath the lid. Accordingly, the attempted removal of the lid while the interior of the unit is above atmospheric pressure causes the lid to be propelled vertically into the air with possible injury being inflicted upon anyone in the vicinity.

It is also possible with prior art pressure cookers, that if the locking means is structurally weakened or is only partially engaged, upon pressurization of the unit, the lid may again be propelled vertically into the air and cause possible injury.

SUMMARY OF THE INVENTION

Accordingly, it is an object of the present invention to prevent the lid of a pressure cooker from being propelled into the air if the lid becomes unlocked when the unit is still pressurized to some extent.

The present pressure cooker is the type having a receptacle open at the top, a lid for closing the receptacle, a locking means engaging the lid and a plurality of brackets fixed to the receptacle and engageable with the locking means to retain the lid on the receptacle when the latter is pressurized. The improvement here resides in the brackets which are fixed to the receptacle and have extensions that extend inward over the rim of the receptacle. The brackets with the extensions are positioned so that the lid is removable laterally but not vertically.

In the case where there are two brackets and the receptacle is cylindrical, the brackets are positioned at diametrically opposite points on the receptacle, so that the ends of the opposing bracket extensions are spaced apart a distance less than the diameter of the lid.

BRIEF DESCRIPTION OF THE DRAWING

Although the aspects and features of this invention which are considered to be novel are expressed in the appended claims, further details as to preferred practices and as to the further objects and features thereof may be most readily comprehended through reference to the following description of the preferred embodiment taken in connection with the accompanying drawing, in which:

DESCRIPTION OF THE PREFERRED EMBODIMENT

Figure 1:
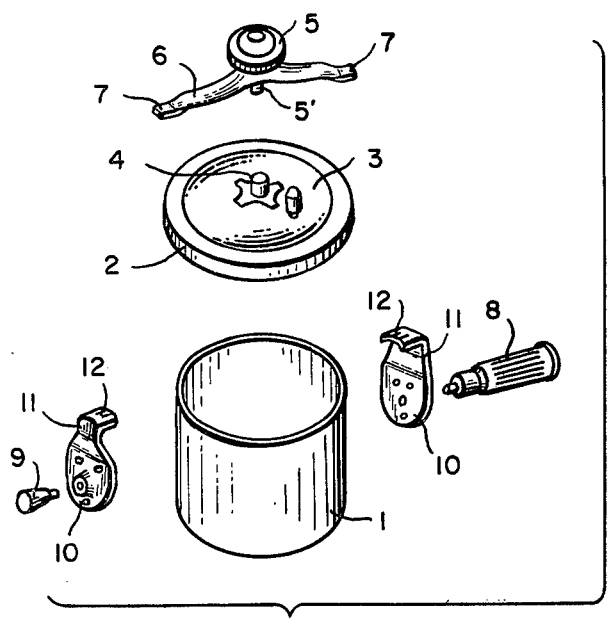
FIG. 1 is an exploded perspective view of the improved pressure cooker.
Figure 2:
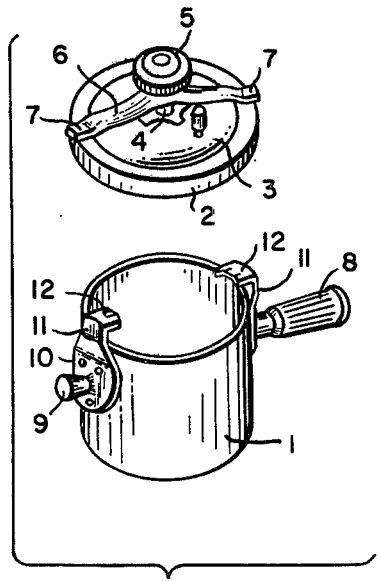
FIG. 2 is a perspective view of the FIG. 1 pressure cooker with the lid removed.

The separate parts of my pressure cooker are shown in FIG. 1. There is a receptacle 1 open at the top and preferably cylindrical in shape. The cooker also includes a lid 3 with turned down edges forming a flange 2. The lid 3 provides a closure for the opening in the receptacle 1. In the center of the lid 3 is an upstanding sleeve 4 into which fits an axle 5' having a knob 5 on its upper end. The axle can turn freely in the sleeve.

The pressure cooker also includes a curved-back transverse shaft or beam 6 with straight extremities 7. The straight extremities fit under a pair of brackets 10 fastened at diametrically opposite side points on receptacle 1. The part of axle 5' passing through beam 6 is threaded to mate with threads in the shaft passage receiving the axle.

There is also a handle 8 and lug 9 attached to the receptacle 1 to facilitate easy handling of the pressure cooker. In the illustrated cooker, the two brackets 10 are actually attached to the receptacle 1 by the handle 8 and lug 9.

Figure 3:
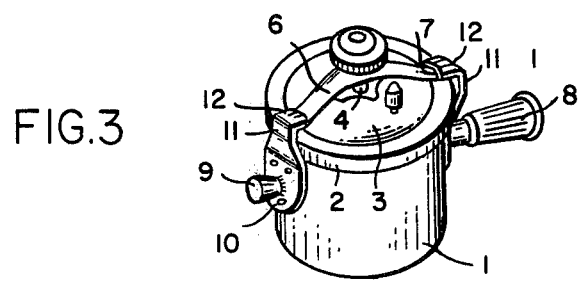
FIG. 3 is a similar view thereof with the lid in place.
Figures 4, 4A:
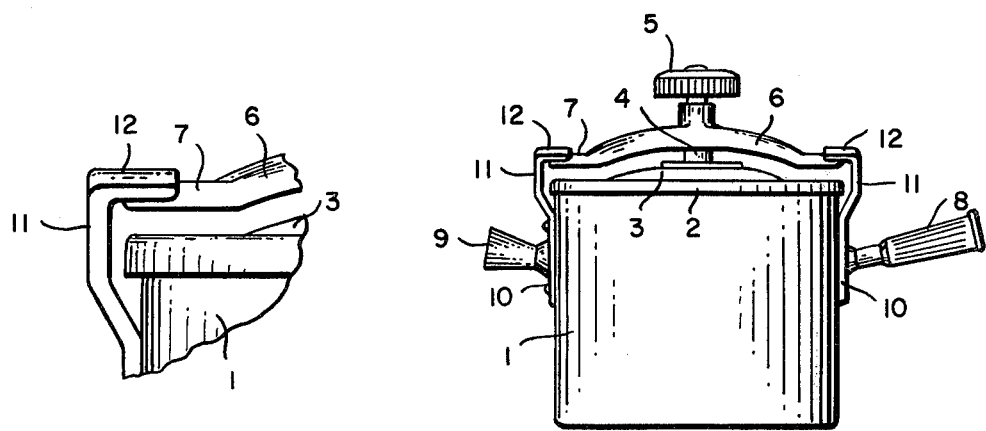
FIG. 4 is a side view of the cooker showing the brackets and lid locking means in greater detail.

Each bracket 10 is formed with a bracket extension 12 which extends inward over the rim of the receptacle 1 so that the distance between the opposing ends of the bracket extension 12 is less than the diameter of the lid 3. The undersurfaces of the bracket extensions 12 are concave to help retain the beam extremities 7 in place when the pressure cooker is closed and locked as in FIG. 3. To close and seal the pressure cooker, the lid 3 is laterally slid over the receptacle 1 and under bracket extensions 12 so that the lid flange 2 surrounds the rim of the receptacle 1. The beam 6 is then positioned so that the end of axle 5' is placed in the sleeve 4 on the lid 3 and the straight beam extremities 7 are engaged under the bracket extensions 12. Next knob 5 is turned so that axle 5' screws down into beam 6. Continued turning of knob 5 lifts the beam 6 away from lid 3 so that beam extremities 7 react against bracket extremities 12. To remove the lid, the foregoing procedure is reversed.

In use, the lid 3 cannot be propelled into the air vertically by pressure inside the receptacle when the beam 6 is released because the upper end of the brackets 12 extend over the lid 3 and thus prevent lid motion in that direction.

I claim:

1. A pressure cooker including a receptacle open at the top, a lift-off lid to close said receptacle, said lid including a depending peripheral lip for engaging over the top of said receptacle, a pair of brackets removably fixed to said receptacle at diametrically opposite locations thereon, said brackets having extensions which project inward over the top of said receptacle sufficient distances to allow lateral removal of the lid but preventing the vertical removal thereof, a sleeve projecting up from the top of said lid at the center thereof and locking means reacting between said lid and said brackets to press the lid down against the receptacle top, said locking means including a bar for spanning the distance between said brackets, an axle threaded into said bar at the center thereof, said axle being dimensioned for slidable engagement in said sleeve so that the bar is separable from the lid when the lid is removed from the receptacle.

* * * * *